(12) United States Patent
Chen

(10) Patent No.: US 9,506,508 B2
(45) Date of Patent: Nov. 29, 2016

(54) ONE-WAY TRANSMISSION MODULE

(71) Applicant: Fu Sheng Chen, Taichung (TW)

(72) Inventor: Fu Sheng Chen, Taichung (TW)

( * ) Notice: Subject to any disclaimer, the term of this patent is extended or adjusted under 35 U.S.C. 154(b) by 0 days.

(21) Appl. No.: 14/661,316

(22) Filed: Mar. 18, 2015

(65) Prior Publication Data
US 2016/0273594 A1 Sep. 22, 2016

(51) Int. Cl.
| F16D 41/12 | (2006.01) |
| F16D 41/066 | (2006.01) |
| F16D 41/28 | (2006.01) |
| F16D 41/30 | (2006.01) |
| B60B 27/04 | (2006.01) |
| B60B 27/02 | (2006.01) |

(52) U.S. Cl.
CPC ............. F16D 41/12 (2013.01); B60B 27/023 (2013.01); B60B 27/047 (2013.01); F16D 41/28 (2013.01); F16D 41/30 (2013.01); *F16D 2041/0665* (2013.01)

(58) Field of Classification Search
CPC .................. F16D 41/28; F16D 41/30; F16D 2041/0608; F16D 2041/0665; F16D 41/12; F16D 41/0608; F16D 41/066; B60B 27/047; B60B 27/023

USPC ............................................................ 192/64
See application file for complete search history.

(56) References Cited

U.S. PATENT DOCUMENTS

| 5,332,294 A * | 7/1994 | Haeussinger ......... B60B 27/023 192/64 |
| 5,518,096 A * | 5/1996 | Lin ........................ B60B 27/023 192/64 |
| 2002/0139631 A1* | 10/2002 | Wang ...................... F16D 41/30 192/64 |
| 2006/0081434 A1* | 4/2006 | Chen ....................... F16D 41/30 192/64 |

* cited by examiner

Primary Examiner — Richard Lorence

(57) ABSTRACT

A one-way transmission module includes two rings and at least one catch. The first ring is used for connection to a hub. The second ring is used for connection to a flywheel-bearing drum. The catch is arranged between the first and second rings to allow the first ring to rotate the second ring in a first direction but prevent the first ring from rotating the second ring in a second direction opposite to the first direction. The first or second ring includes a non-circular profile while the second or first ring includes a non-circular opening.

10 Claims, 6 Drawing Sheets

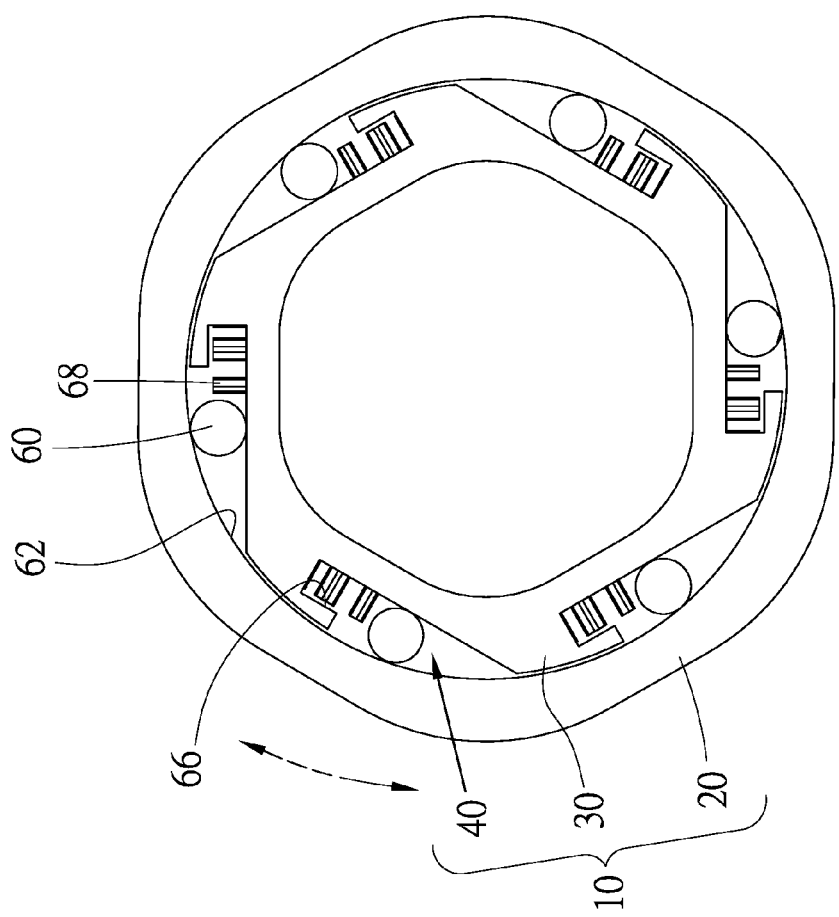

ONE-WAY TRANSMISSION MODULE

BACKGROUND OF INVENTION

1. Field of Invention

The present invention relates to a bicycle and, more particularly, to a one-way transmission module arranged between a hub and a flywheel set.

2. Related Prior Art

A typical bicycle includes a frame, a fork rotationally connected to a front portion of the frame, a front wheel rotationally connected to the fork, a rear wheel rotationally connected to a rear portion of the frame, a sprocket rotationally connected to a middle portion of the frame, two cranks operatively connected to the sprocket, a flywheel set connected to the rear wheel, and a chain for operatively connecting the flywheel set to the sprocket. The rear wheel includes rim, a hub and spokes for connecting the rim to the hub. A one-way transmission mechanism is arranged between the hub and the flywheel set. Thus, the flywheel set rotates the hub, but the hub does not rotate the flywheel set.

As disclosed in Taiwanese Patent M314697, a conventional hub assembly includes a one-way transmission mechanism arranged between a hub 20 and a drum 40. The drum 40 is used to support a flywheel set. The one-way transmission mechanism includes a ring 24 fit in an opening 23 made in the hub 20, a ring 41 formed on the drum 40, and catches or pawls 42 arranged between the ring 41 and the ring 24. Each catch 42 is formed with a sharp end and an obtuse end. The ring 41 includes recesses each for receiving the obtuse end of a corresponding catch 42 so that the catches 42 can pivot relative to the ring 41. A C-clip is used to keep the catches 42 on the ring 41. The ring 24 is formed with teeth for engagement with the sharp ends of the catches 42. The ring 41 is inserted in the ring 24. When the ring 41 rotates in a first direction, the sharp ends of the catches 42 engage with some of the teeth of the ring 42 so that the ring 41 rotates the ring 24 in the first direction. As the ring 24 stops or rotates in a second direction, the sharp ends of the catches 42 rattle and slide on the teeth of the ring 42 to allow the ring 24 to rotate in the first direction relative to the ring 41. Inevitably, the teeth of the ring 24 and the catches 42 wear away against each other. In such a case, the ring 24 and the catches 42 should be removed from the hub 20 and replaced with new ones. However, it is difficult to remove the ring 24 from the hub 20. In fact, it is almost impossible to remove the ring 24 from the hub 20 without causing damage to the hub 20. Therefore, in practice, the entire hub assembly is replaced with a new hub assembly when only the ring 24 and the catches 42 are worn out.

The present invention is therefore intended to obviate or at least alleviate the problems encountered in prior art.

SUMMARY OF INVENTION

It is the primary objective of the present invention to provide a one-way transmission module that can easily be arranged between a hub and a flywheel set and removed from the hub and the flywheel set.

To achieve the foregoing objectives, the one-way transmission module includes two rings and at least one catch. The first ring is used for connection to a hub. The second ring is used for connection to a flywheel-bearing drum. The catch is arranged between the first and second rings to allow the first ring to rotate the second ring in a first direction but prevent the first ring from rotating the second ring in a second direction opposite to the first direction. The first or second ring includes a non-circular profile while the second or first ring includes a non-circular opening.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein:

FIG. 6 is a front view of the one-way transmission module shown in FIG. 5, with a sealing ring removed.

DETAILED DESCRIPTION OF EMBODIMENTS

Figure 1:
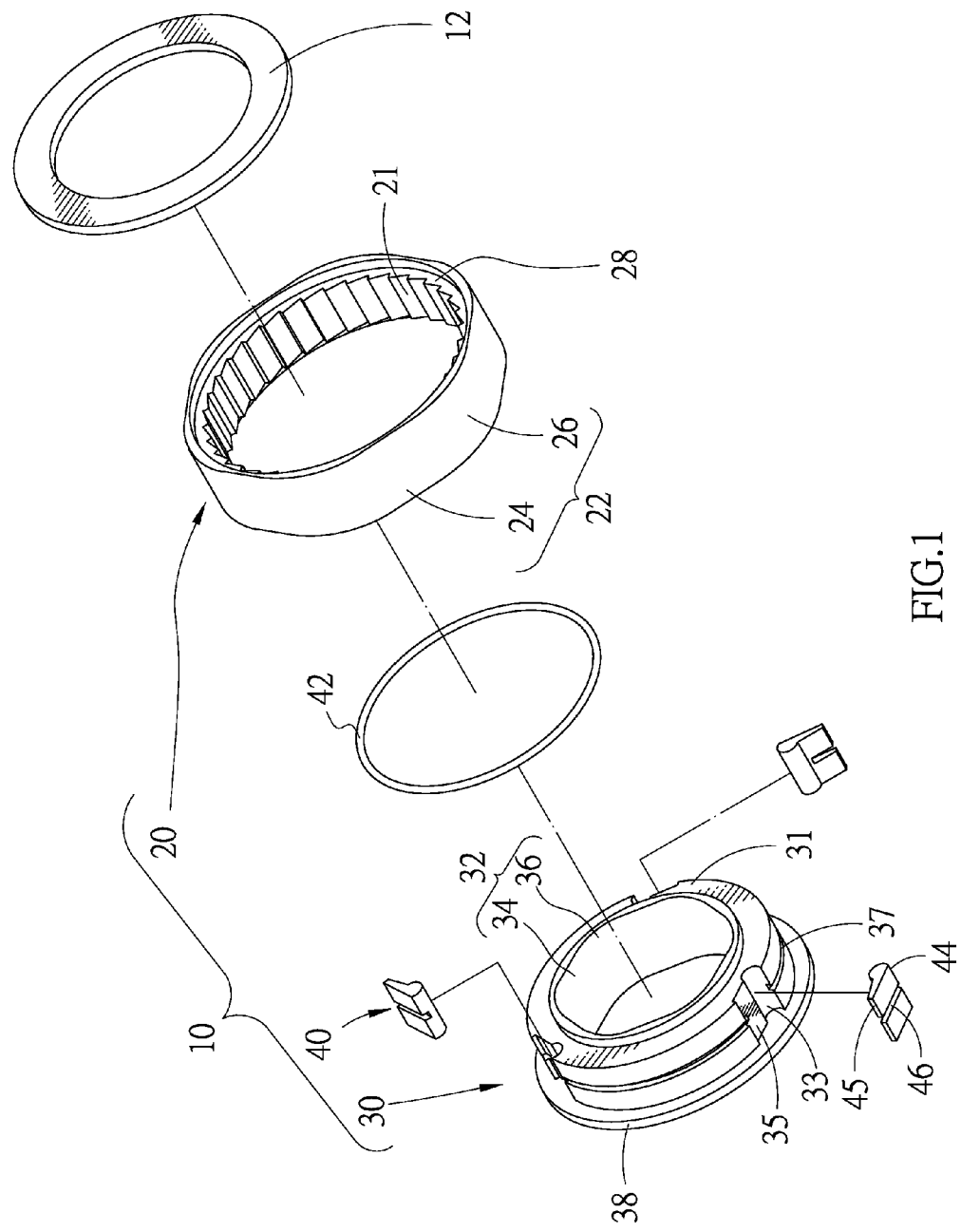
FIG. 1 is an exploded view of a one-way transmission module according to the first embodiment of the present invention.
Figure 2:
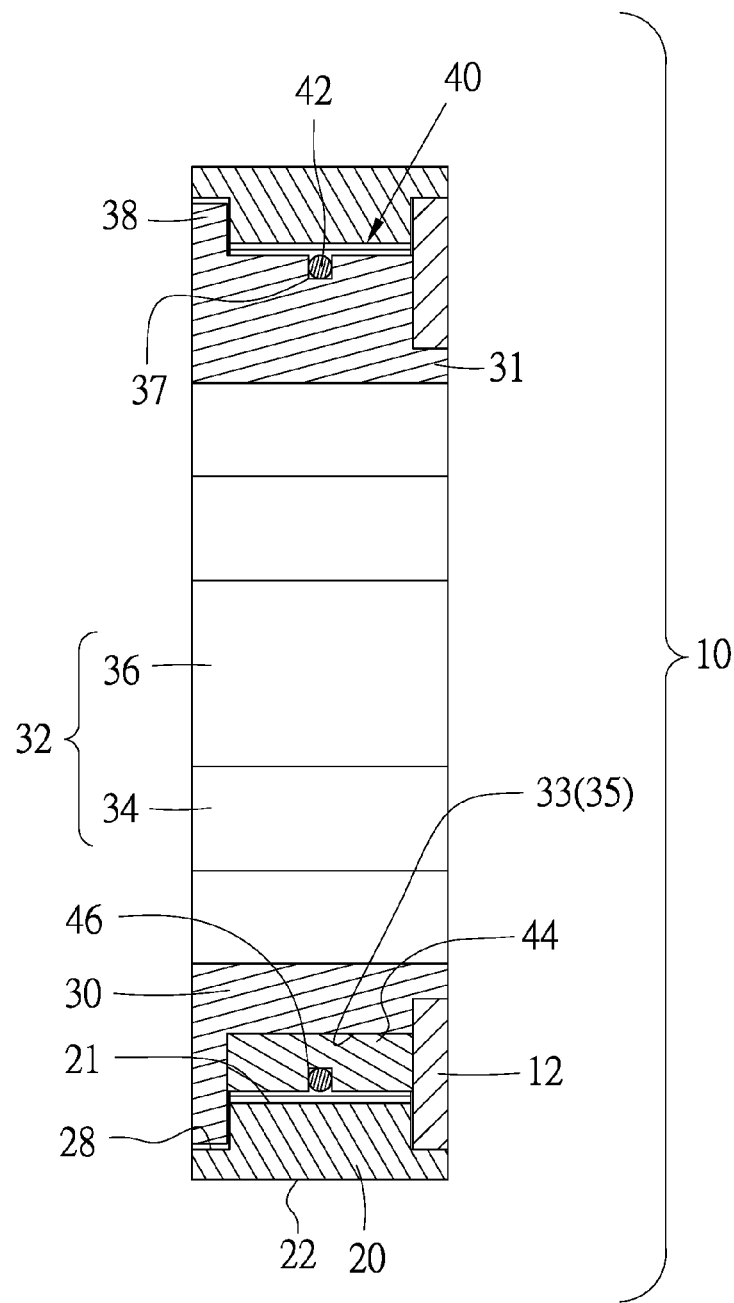
FIG. 2 is a cross-sectional view of the one-way transmission module shown in FIG. 1.
Figure 3:
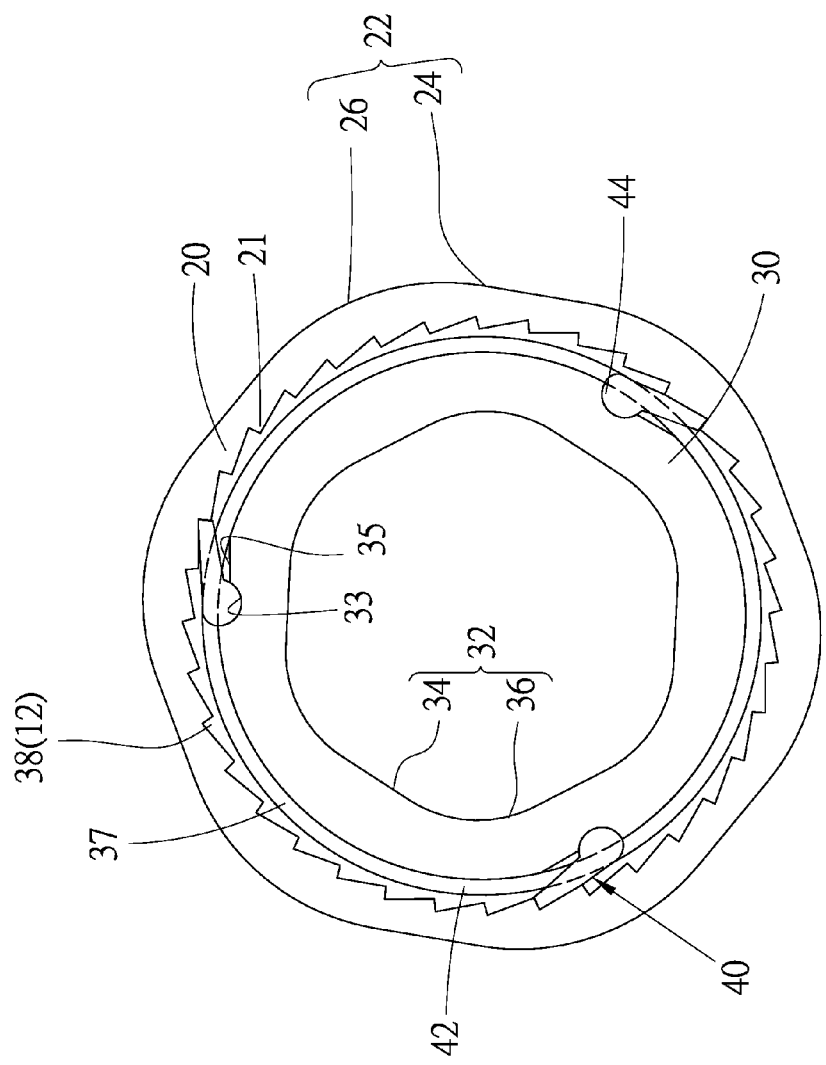
FIG. 3 is a front view of the one-way transmission module shown in FIG. 1, with a sealing ring removed.

Referring to FIGS. 1 to 3, a one-way transmission module 10 includes a first ring 20, a second ring 30, a catch or pawl set, an elastic ring 42 and a sealing ring 12 according to a first embodiment of the present invention. The first ring 20 includes teeth 21 on an internal face, a non-circular profile 22 on an external face, and two shallow cavities 28 each made in an end. The non-circular profile 22 is preferably a hexagonal profile including six planar facets 24 and six convex facets 26.

The second ring 30 includes an insert 31 and a flange 38 formed at an end of the insert 31. The insert 31 includes three deep recesses 33 made in an external face, three shallow recesses 35 each in communication with a corresponding deep recess 33, and an annular groove 37 in communication with all of the deep and shallow recesses 33 and 35. In another embodiment, the insert 31 can include another number of deep recesses 33 and shallow recesses 35. The deep recesses 33 are preferably semi-circular ones. The second ring 30 includes a non-circular space 32 on an internal face. The non-circular space 32 is preferably a hexagonal profile including six planar facets 34 and six convex facets 36.

The catch set includes three catches 40 corresponding to the deep recesses 33 and the shallow recesses 35. Each catch 40 includes a sharp portion 45 at an end, an obtuse portion 44 at an opposite end, and a groove 46 made in the sharp portion 45. The obtuse portion 44 of each catch 40 is a semi-circular portion in compliance with the corresponding deep recess 33. The sharp portion 45 of each catch 40 is shaped in compliance with the corresponding shallow recesses 35.

The obtuse portion 44 of each catch 40 is rotationally inserted in the corresponding deep recess 33. The elastic ring 42 is used to keep the catches 40 on the insert 31. The elastic ring 42 is inserted in the grooves 46 of the sharp portions 45 of the catches 40 and the annular groove 37 of the insert 31. The catches 40 and the insert 31 are inserted in the ring 20. The flange 38 is inserted in one of the shallow cavities 28. The sealing ring 12 is inserted in the other shallow cavity 28.

When the second ring 30 is rotated in a first direction, the sharp portions 45 of the catches 40 engage with some of the teeth 21 of the first ring 20 as shown in FIG. 3. Thus, the second ring 30 rotates the first ring 20 in the first direction.

When the second ring 30 is stopped or rotated in a second direction opposite to the first direction, the elastic ring 42 withdraw the sharp portions 45 of the catches 40 into the shallow recesses 35. Thus, the sharp portions 45 of the catches 40 rattle and slide on the teeth 21 of the first ring 20. Hence, the second ring 30 is prevented from stopping or rotating the first ring 20 in the second direction. That is, the first ring 20 is allowed to rotate in the first direction relative to the second ring 30.

Figure 4:
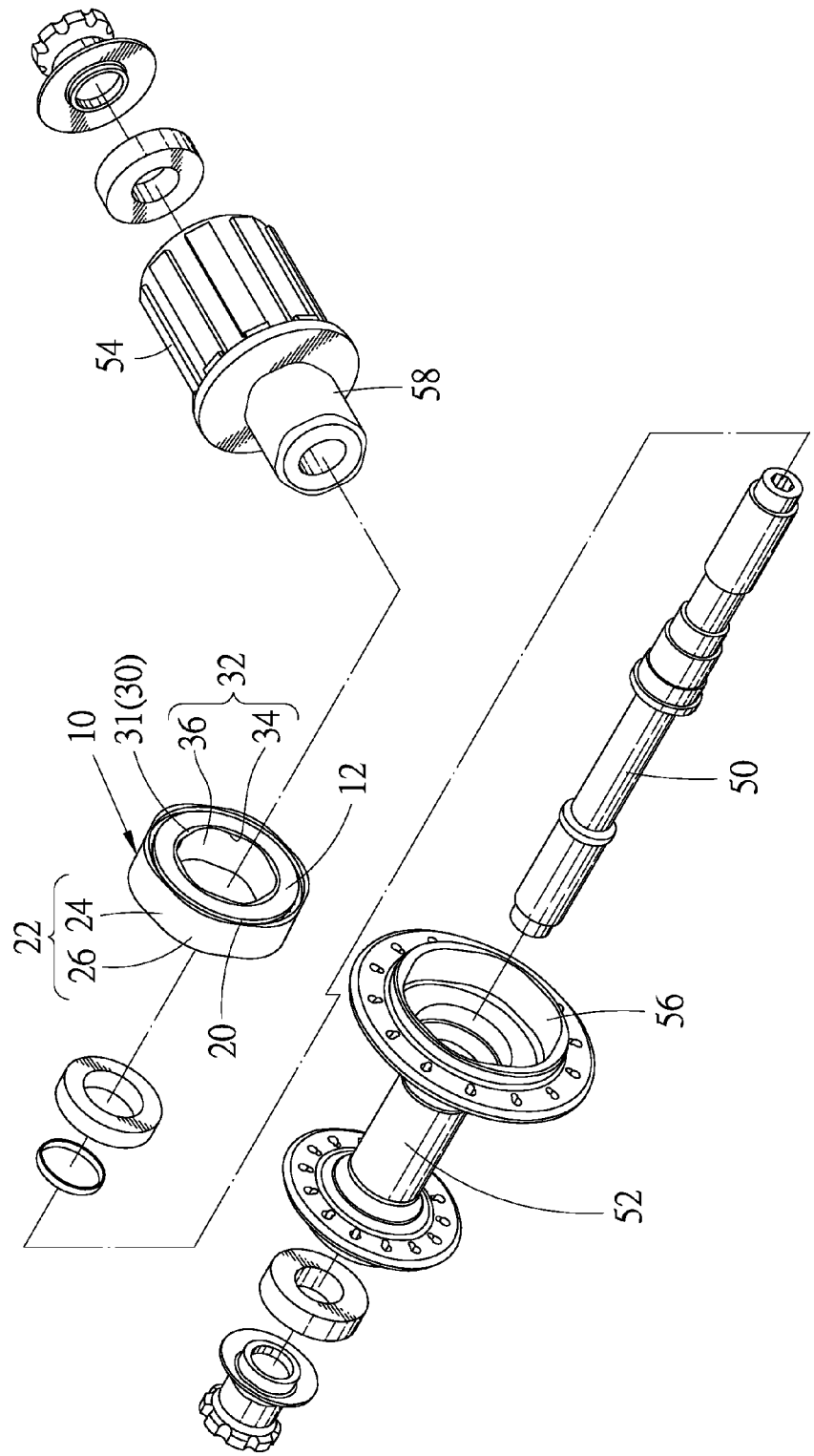
FIG. 4 is an exploded view of a hub assembly including the one-way transmission module shown in FIG. 1.

Referring to FIG. 4, a hub assembly includes a hollow axle 50, a hub 52 and a drum 54 in addition to the one-way transmission module shown in FIGS. 1 to 3. The hub 52 includes a non-circular opening 56 made in an end. The drum 54 includes a non-circular end 58. The one-way transmission module 10 is inserted in the non-circular opening 56. The hub 52 is not rotatable relative to the first ring 20 because the non-circular opening 56 is shaped in compliance with the non-circular profile 22. The non-circular end 58 is inserted in the non-circular space 32. The drum 54 is not rotatable relative to the second ring 30 because the non-circular end 58 is shaped in compliance with the non-circular space 32. The hollow axle 50 is inserted in the drum 54. The drum 54 is used to support a flywheel set (not shown) in operation.

The one-way transmission module 10 is easily inserted in the non-circular opening 56 and located on the non-circular end 58. If the one-way transmission module 10 is broken, it can easily be removed from the non-circular opening 56 and the non-circular end 58 without causing any damage to the hub 52 and the drum 54. Then, only the one-way transmission module 10 is replaced with a new one without having to replace the hub 52 or the drum 54 with a new one. Thus, the cost of use and maintenance of the hub assembly of the present invention is low.

Alternatively, the non-circular opening 56 can be made in the drum 54, and the non-circular end 58 formed on the hub 52. However, in such a case, the axis of the one-way transmission module 10 should be rotated for 180° before the one-way transmission module 10 is inserted in the non-circular opening 56.

Figure 5:
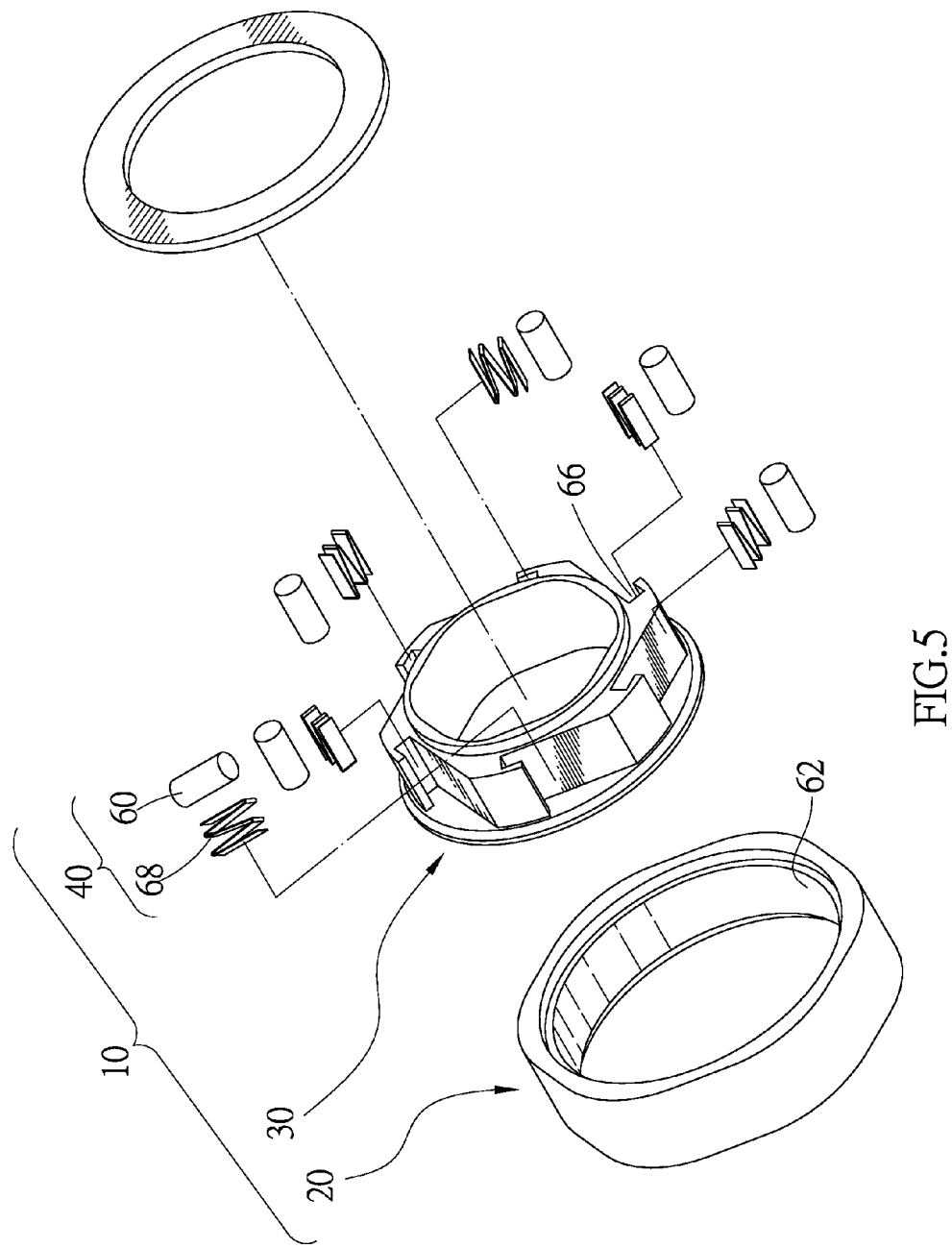
FIG. 5 is a cross-sectional view of a one-way transmission module according to the second embodiment of the present invention.

Referring to FIGS. 5 and 6, there is a one-way transmission module according to a second embodiment of the present invention. The second embodiment is identical to the first embodiment except for several features. Firstly, the first ring 20 is formed with a smooth internal face 62 instead of the teeth 21. Secondly, the second ring 30 includes slant recesses 66 instead of the deep and shallow recesses 33 and 35. The depth of each slant recess 66 extends in a slant manner relative to any radius of the second ring 30. Thirdly, each catch 40 includes a rod 60 and a spring 68 instead of a single element. Each catch 40 is inserted in a corresponding slant recess 66 by inserting the rod 60 in the slant recess 66 after the spring 68.

When the second ring 30 rotates in a first direction, the rods 60 are tightly sandwiched between the external face of the second ring 30 and the smooth internal face 62 of the first ring 20. Accordingly, the second ring 30 pushes the rods 60, and the rods 60 push the first ring 20. Hence, the second ring 30 rotates the first ring 20 in the first direction.

When the first ring 20 stops or rotates in a second direction opposite to the first direction, each rod 60 is allowed to retreat into the corresponding slant recess 66. Thus, each rod 60 is allowed to slide or roll on the smooth internal face 60 of the first ring 20. The second ring 30 pushes the rods 60, but the rods 60 do not push the first ring 20. Hence, the first ring 20 is allowed to rotate in the first direction relative to the second ring 30.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A one-way transmission module including:
   a first ring;
   a second ring; and
   at least one catch arranged between the first and second rings to allow the first ring to rotate the second ring in a first direction but prevent the first ring from rotating the second ring in a second direction opposite to the first direction;
   wherein one of the first and second rings includes a non-circular profile adapted for insertion in a compliant non-circular opening made in one of a hub and a flywheel-supporting drum while the other one of the first and second rings includes a non-circular opening adapted for receiving a compliant non-circular portion of the other one of the hub and the flywheel-supporting drum.

2. The one-way transmission module according to claim 1, wherein the non-circular profile includes at least one planar facet.

3. The one-way transmission module according to claim 2, wherein the non-circular profile includes at least one convex facet next to the planar facet.

4. The one-way transmission module according to claim 1, further including a sealing ring inserted in a shallow cavity made in an end of the first ring.

5. The one-way transmission module according to claim 4, wherein the second ring includes:
   a flange inserted in another shallow cavity made in another end of the first ring; and
   an insert extending into the first ring from the flange.

6. The one-way transmission module according to claim 1, wherein the first ring includes teeth formed thereon and directed to the second ring, wherein the catch is pivotally connected to the second ring between an extended position and a withdrawn position, wherein when the first ring is rotated in the first direction, the catch is moved into the extended position for engagement with one of the teeth to allow the first ring to rotate the second ring, wherein when the second ring is rotated in the second direction, the catch is moved into the withdrawn position for disengagement from the teeth to prevent the first ring from rotating the second ring in the second direction.

7. The one-way transmission module according to claim 6, further including an elastic ring for keeping the catch on the second ring.

8. The one-way transmission module according to claim 1, wherein the first ring is formed with a smooth internal face, wherein the second ring includes at least one slant recess, wherein the catch includes a rod and a spring inserted in the slant recess before the rod in the slant recess.

9. A hub assembly including the one-way transmission module according to claim 1, further including a hub and a drum, wherein one of the hub and the drum includes a non-circular opening for receiving a non-circular profile of the one-way transmission module while the other one of the hub and the drum includes a non-circular end inserted in a non-circular opening of the one-way transmission module.

10. The hub assembly according to claim 9, further including a hollow axle inserted through the hub and the drum.

\* \* \* \* \*